United States Patent [19]
Weise et al.

[11] Patent Number: 5,485,558
[45] Date of Patent: Jan. 16, 1996

[54] METHOD AND SYSTEM FOR DISPLAYING COLOR ON A COMPUTER OUTPUT DEVICE USING DITHERING TECHNIQUES

[75] Inventors: David N. Weise, Kirkland; H- Gunter Zieber, Bellevue, both of Wash.

[73] Assignee: Microsoft Corporation, Redmond, Wash.

[21] Appl. No.: 527,491

[22] Filed: May 22, 1990

[51] Int. Cl.$^6$ .................................................. G06T 17/00
[52] U.S. Cl. ........................................... 395/131; 395/129
[58] Field of Search ........................... 395/119, 131–132, 395/129; 358/456, 457

[56] References Cited

U.S. PATENT DOCUMENTS

| | | |
|---|---|---|
| 4,837,613 | 6/1989 | Paxton et al. . |
| 5,031,050 | 7/1991 | Chan ................................... 358/457 X |
| 5,070,413 | 12/1991 | Sullivan et al. ......................... 358/456 |
| 5,121,196 | 6/1992 | Hung ......................................... 358/75 |
| 5,287,195 | 2/1994 | Blumer ................................ 358/457 X |

OTHER PUBLICATIONS

Jarvis, J. F., C. N. Judice, and W. H. Ninke, "A Survey of Techniques for the Display of Continuous Tone Pictures on Bilevel Displays," *Computer Graphics and Image Processing* 5:13–40, 1976.

*Primary Examiner*—Almis R. Jankus
*Attorney, Agent, or Firm*—Seed and Berry

[57] ABSTRACT

A method and system for generating a dither pattern for a specified color is provided. In a preferred embodiment of the present invention, a system generates a dither pattern corresponding to a specified RGB value. The dither pattern contains a specified number of pels, each pel capable of being set to each color in a set of active colors. Each active color has a corresponding RGB value. Each RGB value is defined as a point in a three dimensional coordinate system having a red, green, and blue component. The coordinate system has a plurality of non-overlapping, spaces with each vertex representing an active color. One space is designated as a mapping space. The system maps the specified RGB value to the mapping space from an original space containing the specified RGB value. The system then determines the four active colors whose corresponding RGB values are closest to the mapped RGB value. The system then determines the number of pels in the dither patter to set to each determined active color based on the distance between the RGB value corresponding to the determined active color and the mapped RGB value. The system then maps the determined active colors to the original space. Finally, the system sets the pels in the dither pattern to the mapped active colors based on the determined number of pels for that color.

24 Claims, 6 Drawing Sheets

METHOD AND SYSTEM FOR DISPLAYING COLOR ON A COMPUTER OUTPUT DEVICE USING DITHERING TECHNIQUES

DESCRIPTION

1. Technical Field

This invention relates generally to a computer system for displaying color on a computer output device, and more specifically, to a method and systems for displaying the color using dithering techniques.

2. Background Art

Computer systems output data in either monochrome or color formats. In certain applications, the display of data in color has many advantages over the monochrome display of data. The use of color allows for easy identification of certain data on a display. For example, a red field could mean data entered incorrectly, whereas a green field could mean data entered correctly. The use of colors also allows sophisticated multicolor graphs, charts, and diagrams to be displayed and printed. Finally, the use of color in an application has a particular aesthetic appeal to computer users that is similar to the appeal color television has over black-and-white television.

Computer systems typically support a variety of color output devices, including video displays and printers. Each of these output devices has differing characteristics. For example, the IBM 8514/A graphics adapter, which provides an interface between the computer and the display, provides the capability to display over 256,000 colors, but only 256 different colors can be displayed at a time. The IBM Enhanced Graphics Adapter (EGA) can display 64 different colors, but only 16 colors can be displayed at a time. When using these adapters, the program sending data to the adapter must specify which colors are the "active" colors; that is, the colors that currently are selected for display.

Each application program that displays color data must account for the differences in the number of active colors the various graphics adapters support. Systems software, such as Microsoft's Windows and Presentation Manager, provides a device-independent application programming interface. A developer of application programs can use standard systems routines to display information on a color output device. The systems software adjusts the data to accommodate the differing characteristics of the graphics adapter, so the application programmer need not be concerned about the differing characteristics of the graphics adapters.

Color graphics adapters normally have three basic color components: red, green, and blue. Each picture element (pel) on a display can be set to any one of the active colors by setting each color component, referred to as a red-green-blue (RGB) value. The intensity of each color can be varied. For example, a low-intensity red value would appear as dim red and a high-intensity red value would appear as bright red. The IBM 8514/A can display 64 different intensity levels of each color, but the IBM EGA can display only 2 different intensity levels for each color.

The IBM 8514/A has 256 active colors. Each active color can be represented in binary form using 8 bits. Each pel has associated with it an 8-bit value representing the active color to be displayed at that pel. By standard programming convention, the 8 bits are divided into 3 bits for red, 3 bits for green, and 2 bits for blue. Thus, eight different intensities of red and green are active, but only four intensities of blue are active. The IBM EGA has only 16 active colors. Thus, each pel has an associated 4-bit value. By standard programming convention, there is one red bit, one green bit, one blue bit, and one intensity bit. The intensity bit selects either high or low intensity for all the colors. Thus, the three colors of a given pel can be displayed either in all high intensity or in all low intensity.

The device-independent application program interfaces provided by systems software can support a much larger number of active colors than is typically supported by graphics adapters that are used on personal computers. For example, the Microsoft Windows program supports over 16 million active colors. An application program using Windows can specify 8 bits of red, 8 bits of green, and 8 bits of blue. Each 8-bit value represents an intensity level of the color between 0 and 255. To display bright red at a pel, the application would select an RGB value of high-intensity red and of zero intensity green and blue, which is represented as (255,0,0). To display half intensity magenta (purple), the application may select an RGB value of (128,0,128), that is, half-intensity red and blue and zero intensity green.

The systems software maps the 8-bit values to the active colors of the graphics adapters. In computer systems using the IBM 8514/A, the systems software maps the three 8-bit values to one 8-bit value and for systems using the IBM EGA, it maps to one 4-bit value.

This mapping results in undesirable effects. An application may specify similar shades of a color using the three 8-bit values. However, the systems software may map the similar, but not identical, shades to the same active color. For example, the systems software maps the 256 possible intensity levels for green and blue to just 8 intensity levels for the IBM 8514/A. Thus, typically 32 different application-specified intensities are actually displayed at the same intensity.

It would be desirable to have a graphics adapter that would support 256 different intensity levels for each of the three colors. This would alleviate this undesirable effect, but would require sophisticated graphics adapters not affordable by the typical personal computer user.

Prior systems have used dithering techniques for effectively increasing the number of active colors. Dithering techniques are based on the principle that the human eye cannot, in general, differentiate individual pels on a display because the pels are too small. Thus, a display filled with alternating red and blue pels would appear to be the color magenta. Similarly, a display filled with alternating red and green pels would appear to be the color cyan. These systems typically use the dithering principle by defining a super-pel, which is a group of adjacent pels. A super-pel typically represents a square grid of pels, N-by-N. However, the grid may be any rectangular or even non-rectangular shape.

When an application program specifies a color to fill an area and that color does not map exactly to an active color, these prior systems define a color pattern for a super-pel. The color pattern when viewed by a human would appear to be an approximation of the application-specified color rather than one of the active colors. These systems then replicate the pattern of the super-pel throughout the area of the display to effect the display of the specified color.

Prior systems typically use simple color patterns for the super-pel, such as alternating two colors. The advantage of simple patterns is that the system can determine the pattern relatively quickly. A disadvantage is that the pattern may not be an acceptable approximation of the specified color. It would be desirable to have a system that could efficiently determine a color pattern that is a very good approximation of the specified color.

DISCLOSURE OF THE INVENTION

It is an object of the present invention to provide a system and method for efficiently generating a color dither pattern.

It is another object of the present invention to provide a system anti method for displaying a color dither pattern on a color output device.

It is another object of the present invention to provide a system and method for generating a dither pattern that is a close approximation of a specified color.

These and other objects, which will become apparent as the invention is more fully described below, are obtained by an improved method and system for generating a dither pattern for a specified color. In a preferred embodiment of the present invention, a system generates a dither pattern corresponding to a specified RGB value. The dither pattern contains a specified number of pels, each pel capable of being set to each color in a set of active colors. Each active color has a corresponding RGB value. Each RGB value is defined as a point in a three dimensional coordinate system having a red, green, and blue component. The coordinate system is logically divided into a set of non-overlapping, tetrahedral spaces with each vertex representing a solid color. One tetrahedral space is designated as a mapping tetrahedral space. The system maps the specified RGB value to the mapping tetrahedral space from an original tetrahedral space containing the specified RGB value. The system then determines the four active colors whose corresponding RGB values are closest to the mapped RGB value. The system then determines the number of pels in the dither pattern to set to each determined active color based on the distance between the RGB value corresponding to the determined active color and the mapped RGB value. The system then maps the determined active colors to the original tetrahedral space. Finally, the system sets the pels in the dither pattern to the mapped active colors base on the determined number of pels for that color and a predefined base pattern to effect the generation of the dither pattern.

DETAILED DESCRIPTION OF THE INVENTION

In a system implementing a preferred embodiment of the present invention, an area on a color display is to be filled in with a specified RGB value. The color display is operatieively connected to an IBM EGA graphics adaptor. The application program specifies the RGB value; each component ranges from 0 to 255. Non-dithering systems would set each pel in the area to the same active color. For example, if the application program specified (128, 31, 190) as an RGB value, then each pel might be set to the active color (0101), which represents the 4-bit value of the color mark magenta, that is, the blue and red bits are selected and the green and intensity bits are not selected. The color dark magenta is the closest active color to the specified RGB value. However, this color is only an approximation of the color specified by the RGB value. Dark magenta has an RGB value of (128, 0, 128). The application program specified an RGB value that had a larger green and larger blue component than is represented by dark magenta.

Figure 1:
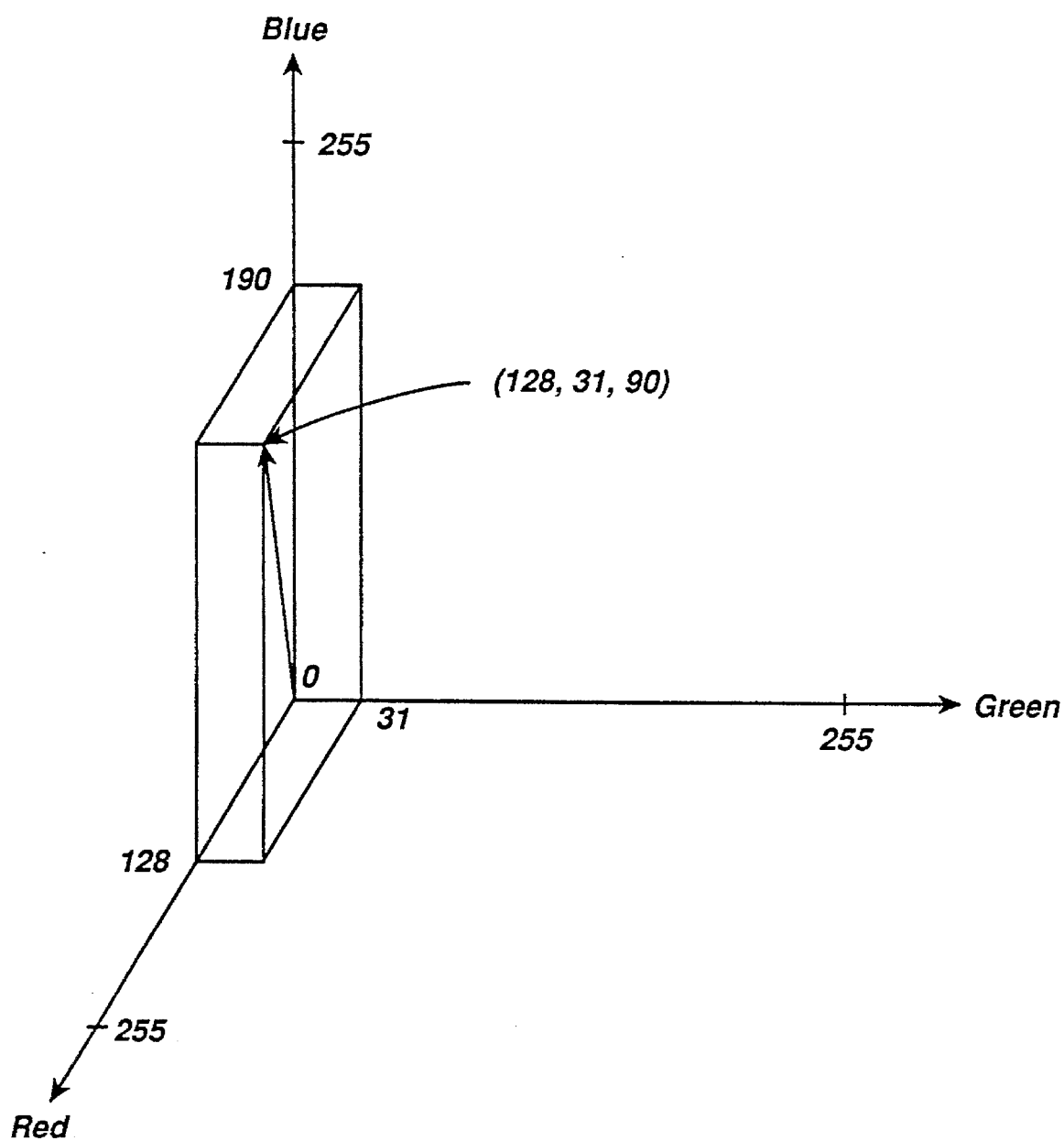
FIG. 1 shows a color space with an axis of the red, green, and blue components of the RGB value.

In a preferred embodiment the system represents the RGB value as a point within a three dimensional color space. FIG. 1 shows the color space with the red, green, and blue values represented as the axes. Each component of the RGB value is in the range of 0 to 255. FIG. 1 shows the point represented by the RGB value of (128, 31, 190) in the color space.

Figure 2:
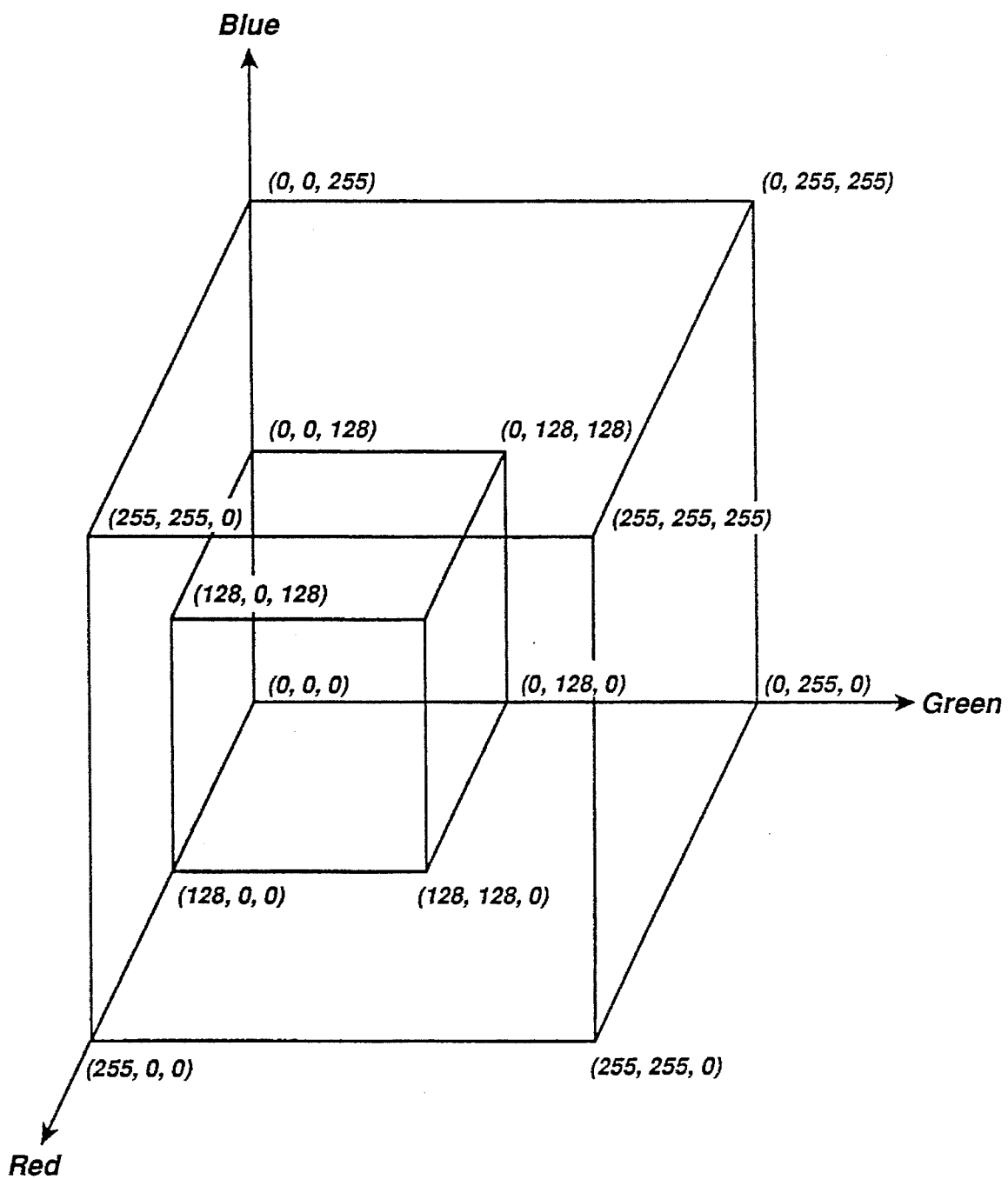
FIG. 2 shows the color cube.

Table 1 represents the RGB values for the active colors in a preferred embodiment. The active colors are selected to be vertices of a "color cube." FIG. 2 shows a color cube of the color space. The color cube contains an inner and an outer cube. The 15 vertices of the color cube represent the 15 active colors. The columns entitled "IBGR" and "(R,G,B)" of Table 1 contain a mapping for the active colors. The notation IBGR represents the bits that select intensity, blue, green, and red. Thus, according to Table 1, the IBGR value of 0101 corresponds to a vertex of the color cube with the RGB value (128, 0, 128), which is dark magenta, and the IBGR value of 1101 corresponds to a vertex of the color cube with the RGB value of (255, 0, 255), which is magenta. A preferred embodiment of the present invention uses only 15 out of the 16 possible active colors. The IBGR value of 1000 is not used. The vertices of the inner cube represent those active colors with their intensity bit set to 0, and the vertices of the outer cube represent those active colors with their intensity bit set to 1. The vertices of the inner cube represent the active colors whose RGB component values are either 0 or 128. The vertices of the outer cube represent the active colors whose RGB component values are either 0 or 255.

TABLE 1

| ( R, | G, | B) | IBGR | # | ACTIVE COLOR |
|---|---|---|---|---|---|
| ( 0, | 0, | 0) | 0000 | 0 | BLACK |
| (128, | 0, | 0) | 0001 | 1 | DARK RED |
| ( 0, | 128, | 0) | 0010 | 2 | DARK GREEN |
| (128, | 128, | 0) | 0011 | 3 | DARK YELLOW |
| ( 0, | 0, | 128) | 0100 | 4 | DARK BLUE |
| (128, | 0, | 128) | 0101 | 5 | DARK MAGENTA |
| ( 0, | 128, | 128) | 0110 | 6 | DARK CYAN |
| (128, | 128, | 128) | 0111 | 7 | GREY |
| | | | 1000 | 8 | |
| (255, | 0, | 0) | 1001 | 9 | RED |
| ( 0, | 255, | 0) | 1010 | 10 | GREEN |
| (255, | 255, | 0) | 1011 | 11 | YELLOW |
| ( 0, | 0, | 255) | 1100 | 12 | BLUE |
| (255, | 0, | 255) | 1101 | 13 | MAGENTA |
| ( 0, | 255, | 255) | 1110 | 14 | CYAN |
| (255, | 255, | 255) | 1111 | 15 | WHITE |

A system implementing a preferred embodiment of the present invention logically divides the area of the color display to be filled with an application-specified RGB value into 8-by-8 groups of pels, called a super-pel. The system fills the super-pel with a dither pattern and replicates the pattern throughout an area of the display. The system determines the four active colors that are the closest colors to the specified RGB value. Continuing with the example above, the four closest colors to the RGB value (128, 31, 190) are IBGR values 0101, 0111, 1100, and 1101, which correspond to the colors dark magenta, grey, blue, and magenta, respectively. The system sets each pel in the super-pels to one of these four colors. The system determines the number of pels, out of the 64 pels in the 8-by-8 super-pel, to set to each color. The number of pels set for a color is inversely proportional to the distance between the vertex corresponding to the color and the specified RGB value. In the example, the system set 18 pels to color 0101, 16 pels to 0111, 15 pels to 1100, and 15 pels to 1101. Since the RGB value (128, 31, 190) is closest to the vertex (128, 0, 128), more pels are set to color 0101 than any of the other 3 colors. The system also determines which pels in the super-pel are to be set to a particular color to effect the generation of a dither pattern.

Figure 3:
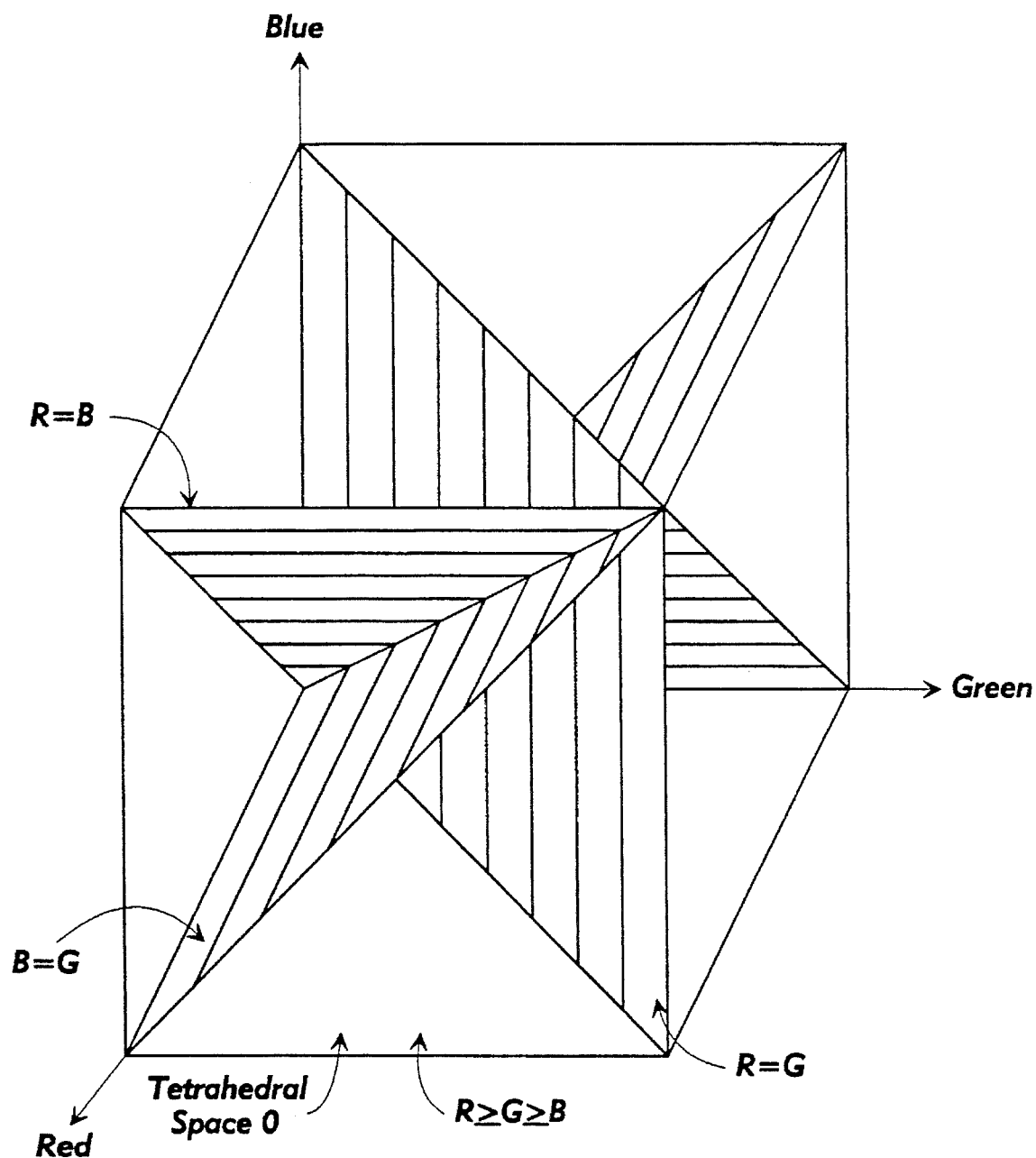
FIG. 3 shows the division of the color cube into six tetrahedral spaces.

To determine the four colors to be displayed in the super-pel, the system logically divides the color cube into six tetrahedral spaces, as shown in FIG. 3. The spaces are defined by three planes: R=B, R=G, and B=G, where R is red, G is green, and B is blue. The six tetrahedral spaces are defined by the equations of Table 2.

TABLE 2

| Tetrahedral Space | Definition |
| --- | --- |
| 0 | R >= G >= B |
| 1 | R >= B >= G |
| 2 | B >= R >= G |
| 3 | B >= G >= R |
| 4 | G >= B >= R |
| 5 | G >= R >= B |

Figure 4:
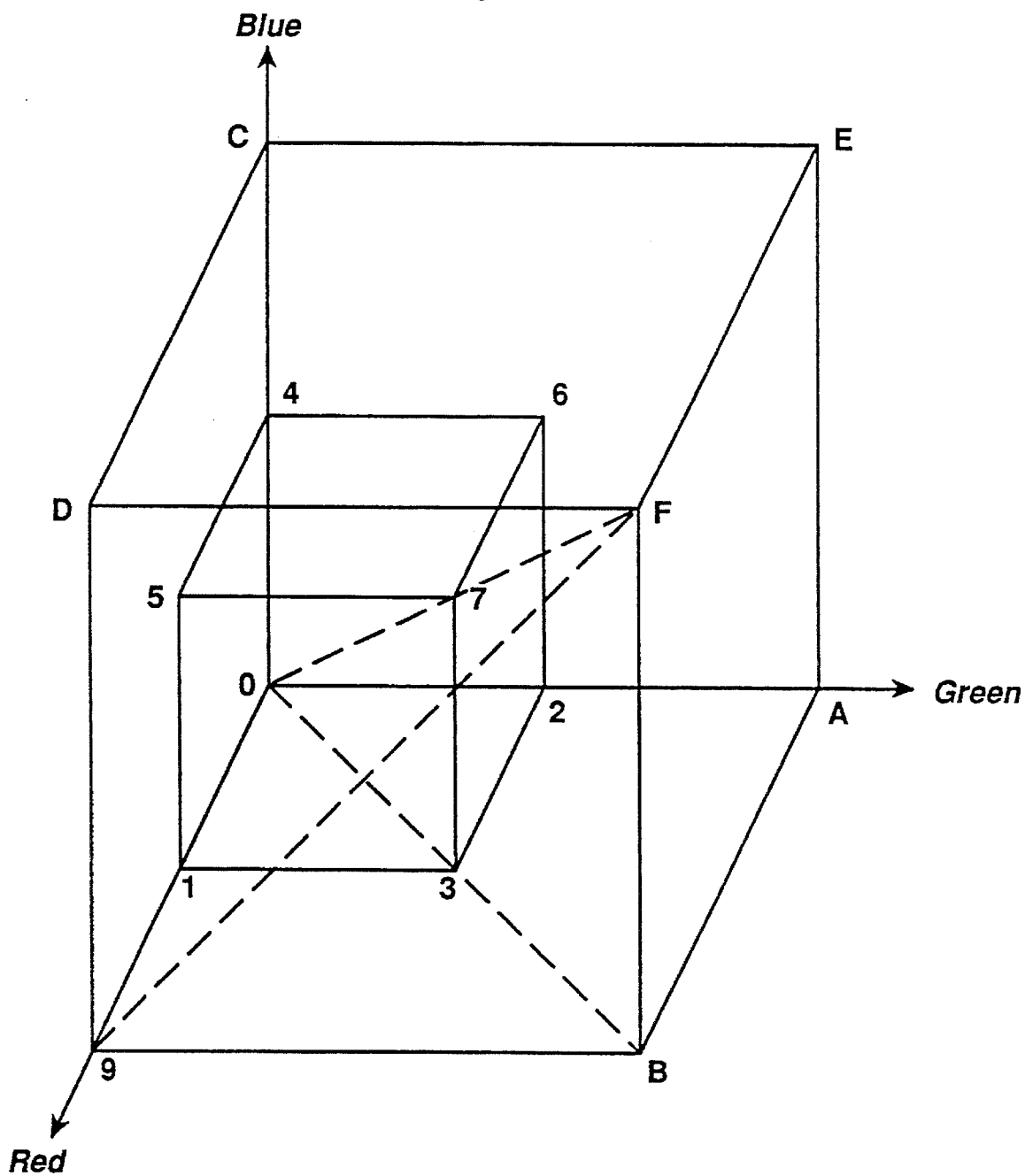
FIG. 4 shows tetrahedral space 0 and the IBGR values of the color cube vertices.

The system maps the specified RGB value from its original tetrahedral space into tetrahedral space 0, determines the four closest colors in space 0, and then maps the closest colors in space 0 back to the colors in the original tetrahedral space. The vertices of tetrahedral space 0 are 0, 9, B, and F, where these values are the hexadecimal representation of the IBGR values. FIG. 4 shows tetrahedral space 0. The mapping is done by first determining if the RGB value is above the R=B plane. This plane is defined by the inner product where (1, 0, −1) * (R, G, B)=0. If (1, 0, −1) * (R, G, B)<0, then the point is above the R=B plane and the system swaps the R and B components of the RGB value. Next, the system determines if the RGB value is above the G=B plane. This plane is defined by the inner product where (0, 1, −1) (R, G, B)=0. If (0, 1, −1) * (R, G, B)<0, then the point is above the G=B plane and the system swaps the G and B components of the RGB value. Finally, the system determines if the RGB value is above the R=G plane. This plane is defined by the inner product where (1, −1, 0) * (R, G, B)=0. If (1, −1, 0) * (R, G, B)< 0, then the point is above the R=G plane and the system swaps the R and G components of the RGB value. The system also records the swapping that occurs so that it can map the closest colors to the mapped RGB value, which are in tetrahedral space 0, back into the colors in the original tetrahedral space.

Table 14 contains C pseudo code that implements a preferred embodiment of the present invention. The function ColorDither is the entry point to the system. The input parameters are the global integer variables R, G, and B, which contain the red, green, and blue components of the application-specified RGB value, respectively. The output is an integer array of 64 elements, named output. Function ColorDither sets the array to contain the dither pattern. Element 0 of array output contains the color for the first pel of the first row of the 8-by-8 super-pel, element 1 contains the color for the second pel of the first row, and so on for the first row, element 8 contains the color for the first pel of the second row, and so on. Function ColorDither is the main function that invokes the other functions that comprise the system.

Function ComputeSymmetry maps the RGB value to tetrahedral space 0. In a preferred embodiment, this function, rather than calculating the inner product to determine whether the RGB value is above a plane, uses the following tests. If variable R is less than variable B, then the function swaps the value of R and B and sets variable SwapRB to true, else the function sets variable SwapRB to false. If variable G is less than variable B, then the function swaps the value of G and B and sets variable SwapGB to true, else the function sets variable SwapGB to false. If variable R is less than variable G, then the function swaps the value of R and G and sets variable SwapRG to true, else the functions sets variable SwapRG to false. The function sets variables SwapRB, SwapGB, and SwapRG to indicate whether the corresponding components of the RGB value were swapped. These variables are used by function ComputePColor to map the colors of tetrahedral space 0 back to colors in the original tetrahedral space. Continuing with the example above, function ComputeSymmetry receives the RGB value of (128, 31, 190). The function maps the RGB value to (190, 128, 31) and sets SwapRB and SwapGB to true and SwapRG to false.

Figure 5:
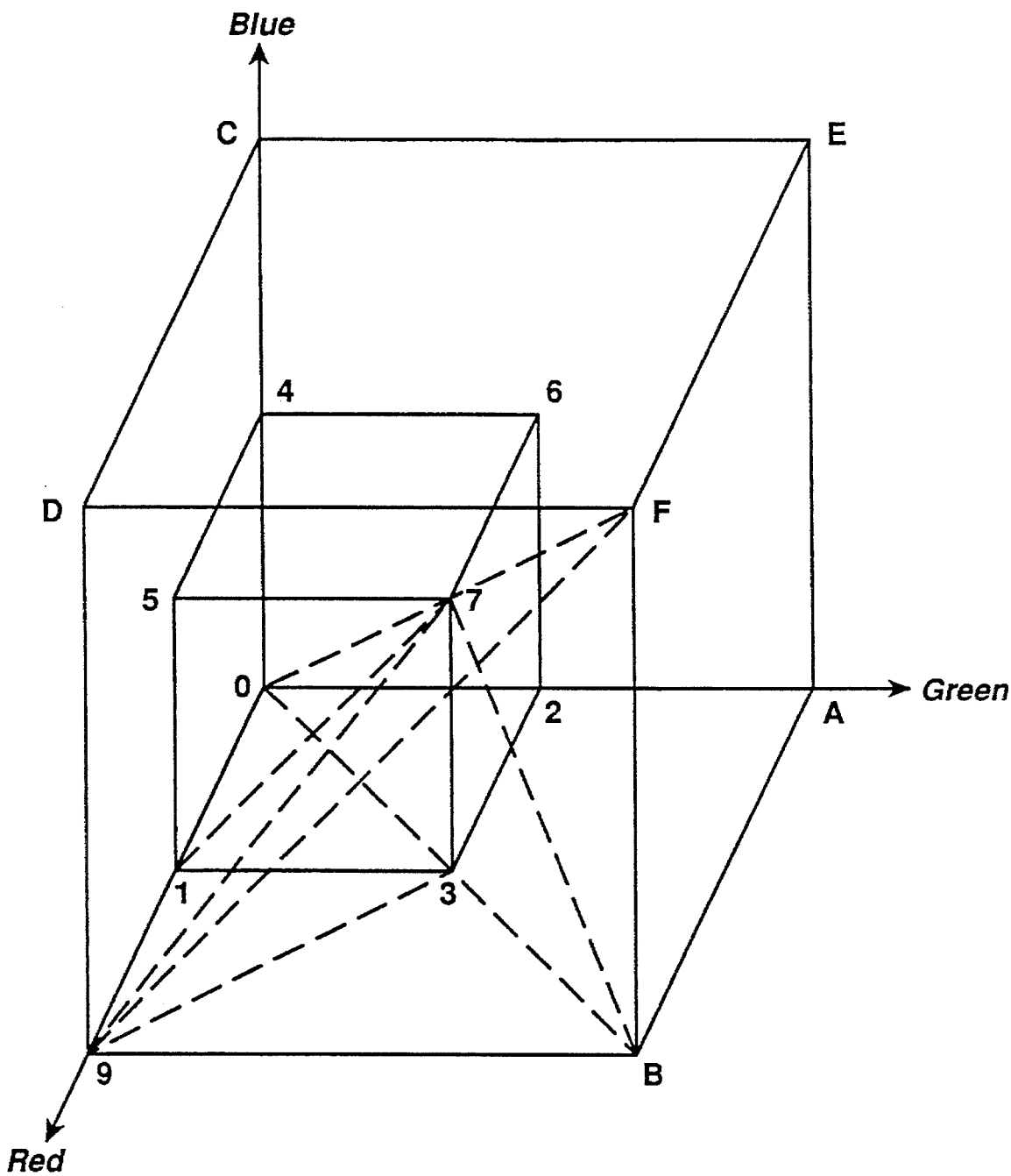
FIG. 5 shows the four tetrahedral subspaces that comprise tetrahedral space 0.

The system logically divides tetrahedral space 0 into four tetrahedral subspaces as shown in FIG. 5. Table 3 lists the vertices of each subspace. The subspaces are defined so that the four closest vertices to each point within a subspace are the four vertices of the subspace.

TABLE 3

| Tetrahedral SubSpace | Vertices |
| --- | --- |
| 0 | 0, 1, 3, 7 |
| 1 | 1, 3, 7, 9 |
| 2 | 3, 7, 9, B |
| 3 | 7, 9, B, F |

The system then determines the subspace which contains the mapped RGB value, that is, the RGB value mapped to tetrahedral space 0. To determine if the mapped RGB value is in subspace 0, the system determines the transform of the mapped RGB value that is in the coordinate system whose origin is at vertex 3. The system determines the transform by subtracting (128, 128, 0) from the mapped RGB value, that is, (R, G, B)−(128, 128, 0). The system then determines if the red component of the transform is less than or equal to 0, that is, if the inner product (−1, 0, 0) * ((R, G, B)−(128, 128, 0)) is greater than or equal to 0. If it is, then the mapped RGB value is in subspace 0. If the mapped RGB value is not in subspace 0, then the system determines if it is in subspace 1. The system determines the transform of the mapped RGB value that is in the coordinate system whose origin is a vertex 3. The system determines the transform by subtracting (128, 128, 0) from the mapped RGB value, that is, (R, G, B)−(128, 128, 0). The system then determines if −1 times the red component of the transform plus −1 times the green component of the transform is greater than or equal to 0, that is, if the inner product (−1, −1, 0) * ((R, G, B)−(128, 128, 0)) is greater than or equal to 0. If it is, then the mapped RGB value is in subspace 1. If the mapped RGB value is not in subspace 0 or 1, then the system determines if it is in subspace 2. The system determines the transform of the mapped RGB value that is in the coordinate system whose origin is at vertex 7. The system determines the transform by subtracting (128, 128, 128) from the mapped RGB value, that is, (R, G, B)−(128, 128, 128). The system then determines if −1 times the red component of the transform plus −1 times the blue component of the transform is greater than or equal to 0, that is, if the inner product (−1, 0, −1) * ((R, G, B)−(128, 128, 128) is greater than or equal to 0. If it is, then the mapped RGB value is in subspace 2. If the mapped RGB value is not in subspace 0, 1, or 2, then it is in subspace 3.

Function ComputeSubspace of the pseudo code determines the subspace which contains the mapped RGB value. Function ComputeSubspace uses an array named origin, which contains four RGB values, one for each subspace. The RGB values in array origin correspond to vertices, 3, 3, 7, and B, respectively. The function also uses an array named vector, which contains four vectors, one for each subspace. The while loop executes until the condition is not satisfied. When the while loop completes the variable i contains the subspace for the mapped RGB value. Continuing with the example above, the function first determines that the mapped RGB value is not in subspace 0 because the inner product (−1, 0, 0) , ((190, 128, 31)−(128, 128, 0)) is −62, which is less than 0. The function then determines that the mapped RGB value is not in subspace 1 because the inner product (−1, −1, 0) * ((190, 128, 31)−(128, 128, 0)) is −62, which is less than 0. The function then determines that the mapped RGB value is in subspace 2 because the inner product (−1, 0, 1) * ((190, 128, 31)−(128, 128, 128)) is 35, which is greater than or equal to 0.

Figure 6:
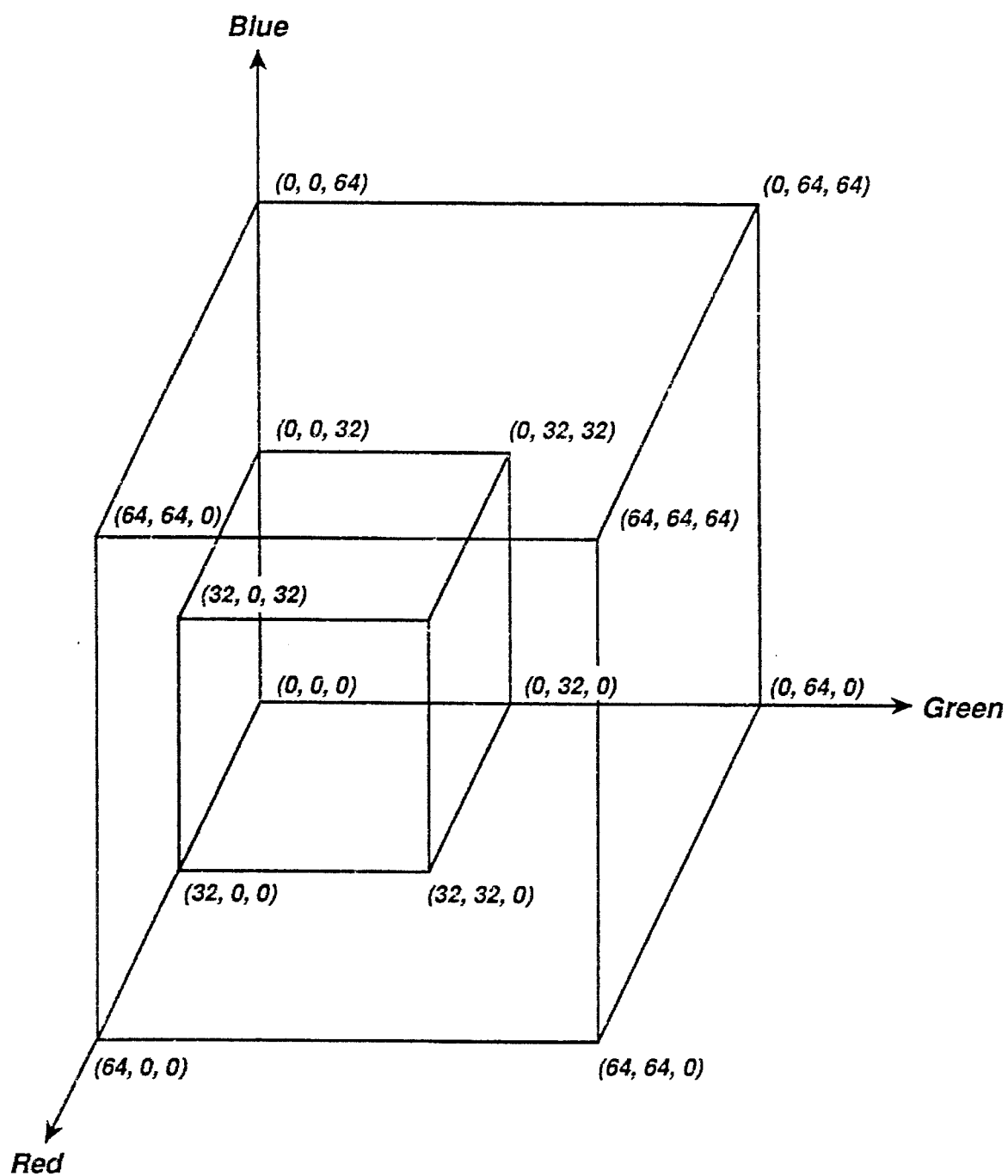
FIG. 6 shows the scaled color cube.

The system then scales each component of the mapped RGB value from the range 0 to 255 to the range of 0 to 64. The system scales each component by the following formula: (R/2+R%2) / 2, where R%2 means R modulo 2. FIG. 6 shows the values of the scaled vertices of the color cube. This scaling can be performed efficiently by using the shift instructions of a typical computer. The system scales to the range of 0 to 64 because a super-pel has 64 pels. In a system employing a super-pel of a different size, the mapped RGB value would be scaled to the range of 0 and the number of pels in the super-pel.

Function Scale of the pseudo code implements the scaling of a value. Function ColorDither invokes this function once for each component of the mapped RGB value and calculates the scaled RGB value. Continuing with the example, the mapped RGB value of (190, 128, 31) is scaled to the value of (47, 32, 8).

The system next determines the number of pels of the super-pel to set to each of the four closest colors, which are by definition of the vertices of the subspace that contains the scaled RGB value. The number of pels to set for each color is based on the distance the scaled RGB value is from each of the four vertices of the subspace. The closer the scaled RGB value is to a vertex the greater the number of pels set corresponding to the color of that vertex. Conversely, the farther the scaled RGB value is from a vertex the lesser the number of pels set corresponding to the color of that vertex. The system determines the distance of each vertex from the scaled RGB value using Manhattan metrics.

The system first transforms the scaled RGB value into a different coordinate system. The coordinate system selected is based upon the subspace that contains the scaled RGB value. For subspace 0, 1, and 2, the system transforms the scaled RGB value to the coordinate system whose origin is at (32, 32, 0), that is, vertex 3 of the scaled color cube. For subspace 3, the system transforms the scaled RGB value to the coordinate system whose origin is at (64, 0, 0), that is, vertex 9 of the scaled color cube. Table 4 shows the transformation.

TABLE 4

Subspace 0, 1, 2

$$\begin{bmatrix} R \\ G \\ B \end{bmatrix} - \begin{bmatrix} 32 \\ 32 \\ 0 \end{bmatrix} = \begin{bmatrix} R' \\ G' \\ B' \end{bmatrix}$$

Subspace 3

$$\begin{bmatrix} R \\ G \\ B \end{bmatrix} - \begin{bmatrix} 64 \\ 0 \\ 0 \end{bmatrix} = \begin{bmatrix} R' \\ G' \\ B' \end{bmatrix}$$

The system then computes the number of pels for each color by applying the following matrix multiplication according to the subspace that contains the transformed scaled RGB value. In Table 5, R' represents the red component of the transformed scaled RGB value and G' and B' represent the green and blue components, respectively. The notation $V_i$, where i ranges from 0 to F, represents the number of pels to be set for the color at vertex i. The number of pels to be set to the fourth color, which is the color at the origin of the transformed coordinate system is 64 minus the total number of pels to be set for the red, green, and blue components, where 64 is the number of pels in the super-pel.

TABLE 5

Subspace 0

$$\begin{bmatrix} -2, & 0, & 0 \\ 2, & 2, & 0 \\ 0, & 0, & 2 \end{bmatrix} * \begin{bmatrix} R' \\ G' \\ B' \end{bmatrix} = \begin{bmatrix} V_0 \\ V_1 \\ V_7 \end{bmatrix}$$

$V_3 = 64 - V_0 - V_1 - V_7$

Subspace 1

$$\begin{bmatrix} -2, & -2, & 0 \\ 2, & 0, & 0 \\ 0, & 0, & 2 \end{bmatrix} * \begin{bmatrix} R' \\ G' \\ B' \end{bmatrix} = \begin{bmatrix} V_1 \\ V_9 \\ V_7 \end{bmatrix}$$

$V_3 = 64 - V_1 - V_9 - V_7$

Subspace 2

$$\begin{bmatrix} 1, & -1, & 0 \\ 1, & 1, & 0 \\ 0, & 0, & 2 \end{bmatrix} * \begin{bmatrix} R' \\ G' \\ B' \end{bmatrix} = \begin{bmatrix} V_9 \\ V_B \\ V_7 \end{bmatrix}$$

$V_3 = 64 - V_9 - V_B - V_7$

Subspace 3

$$\begin{bmatrix} -2, & 0, & 0 \\ 0, & 1, & -1 \\ 1, & 1, & 1 \end{bmatrix} * \begin{bmatrix} R' \\ G' \\ B' \end{bmatrix} = \begin{bmatrix} V_7 \\ V_B \\ V_F \end{bmatrix}$$

$V_9 = 64 - V_7 - V_B - V_F$

Function ComputeTransform of the pseudo code determines the number of pels to be set for three of the four colors that are closest to the scaled RGB value. The input parameter to the function is the variable i, which is the subspace that contains the scaled RGB value. The function uses an array named origin. Array origin contains the RGB value that is the origin of the coordinate system to which the scaled RGB value is transformed. The function uses an array named matrix. Array matrix contains a 3-by-3 matrix for each of the four subspaces. The function multiplies the matrix specified by the subspace (variable i) times the transformed, scaled RGB value to arrive at the number of pels for each of the three vertices of the subspace that is not at the origin of the transformed coordinate system. Continuing with the example above, the scaled RGB value is (47, 32, 8), which is in subspace 2. The system transforms the scaled value to (15, 0, 8) by subtracting (32, 32, 0) from (47, 32, 8). The system then multiplies the value by the matrix for subspace 2. The result is $V_9$ equals 15, $V_B$ equals 15, $V_7$ equals 16, and $V_3$ equals 18. Table 6 shows the matrix multiplication.

TABLE 6

$$\begin{bmatrix} 1, & -1, & 0 \\ 1, & 1, & 0 \\ 0, & 0, & 2 \end{bmatrix} * \begin{bmatrix} 15 \\ 0 \\ 8 \end{bmatrix} = \begin{bmatrix} 15 \\ 15 \\ 16 \end{bmatrix}$$

$$18 = 64 - 15 - 15 - 16$$

To facilitate the processing of the data, function MakeColorCntTable of the pseudo code creates an array named cc, which contains the colors and the associated count of pels to be set. Function MakeColorCntTable as it creates array cc calculates the number of pels for the fourth vertex in the subspace. If the number of pels for a particular color is 0, then that color is not included in array cc. Consequently, the number of entries in array cc can be less than four. Variable nColors contains the count of the number of entries in array cc. The function uses array colors, which contain the corresponding IBGR values of the vertices for each of the four tetrahedral subspaces. Continuing with the example, Table 7 shows the contents of array cc.

TABLE 7

| cc | |
|---|---|
| color | count |
| 3 | 18 |
| 9 | 15 |
| B | 15 |
| 7 | 16 |

The system maps the colors back into the original tetrahedral space. This mapping allows vertices of the original tetrahedral space to be identified. The system performs this mapping on the IBGR value which represents the vertices. For each of the four vertices, if the system originally swapped the red and green components of the RGB value, then the system swaps the R and G component of IBGR. Then if the system originally swapped the green and blue components of the RGB value, then the system swaps the G and B component of the IBGR. If the system originally swapped the red and blue components of the RGB value, then the system swaps the R and B components of IBGR.

Function ComputerPColor maps the colors stored in array cc to the colors of the original tetrahedral space as indicated by the setting of variables SwapRG, SwapGB, and SwapRB. Continuing with the example, the four vertices have an IBGR value of 3, 7, 9, and B. Table 8 shows the mapping back to the original tetrahedral space. The column headed by "R—G" represents that the R and G component is not swapped because they were not swapped during the initially mapping. The columns headed "G<>B" and "R<>B" represent that the G and B and then the R and B components are swapped because they were swapped during the initial mappings. The column entitled "# OF PELS" indicates the number of pels (as determined above) in the super-pel to be set to each mapped color. The column entitled "MAPPED COLOR" indicates the colors of the original tetrahedral space.

TABLE 8

| VERTEX | IBGR | R—G | G<>B | R<>B | MAPPED COLOR | # OF PELS |
|---|---|---|---|---|---|---|
| 3 | 0011 | 0011 | 1101 | 0101 | 5 | 18 |
| 7 | 0111 | 0111 | 0111 | 0111 | 7 | 16 |
| 9 | 1001 | 1001 | 1001 | 1100 | C | 15 |
| B | 1011 | 1011 | 1101 | 1101 | D | 15 |

Table 9 shows the contents of array cc after the colors are mapped back to the original tetrahedral space.

TABLE 9

| cc | |
|---|---|
| color | count |
| 5 | 18 |
| C | 15 |
| D | 15 |
| 7 | 16 |

The system determines dither pattern for placing the colors in the super-pel. The system sorts the mapped colors by intensity. The system will distribute the darkest color first, then next darkest, and so on. This distribution will tend to maximize the spatial frequency of the resulting dither pattern. Table 10 contains each color and its corresponding darkness intensity. Color 0000 is the darkest, color 0100 is the next darkest, and color 1111 is the lightest.

TABLE 10

| REMAPPED COLOR | DARKNESS INTENSITY |
|---|---|
| 0000 | 1 |
| 0001 | 3 |
| 0010 | 4 |
| 0011 | 7 |
| 0100 | 2 |
| 0101 | 5 |
| 0110 | 6 |
| 0111 | 8 |
| 1000 | |
| 1001 | 10 |
| 1010 | 11 |

TABLE 10-continued

| REMAPPED COLOR | DARKNESS INTENSITY |
|---|---|
| 1011 | 14 |
| 1100 | 9 |
| 1101 | 12 |
| 1110 | 13 |
| 1111 | 15 |

The system uses the base pattern shown in Table 11 for the distribution of the colors. The system selects the darkest color and the associated number of pels to be set to that color. The system then sets each pel of the super-pel whose corresponding position in the base pattern contains a number less than associated number to the darkest color. The system then selects the second darkest color and the associated number of pels. The system then sets each pel of the super-pel whose corresponding position in the base pattern contains a number, that is equal to the number of pels set so far but that is less than the sum of the number of pels set so far plus the second associated number, to the second darkest color. The system then selects the third darkest color and the associated number of pels to set for that color. The system then sets each pel of the super-pel whose corresponding position in the base pattern contains a number, that is equal to the number of pels set so far but that is less than the sum of the number of pels set so far plus the third associated number, to the third darkest color. The system then sets each pel not yet set equal to the lightest color.

TABLE 11

| 0 | 32 | 8 | 40 | 2 | 34 | 10 | 42 |
|---|---|---|---|---|---|---|---|
| 48 | 16 | 56 | 24 | 50 | 18 | 58 | 26 |
| 12 | 44 | 4 | 36 | 14 | 46 | 6 | 38 |
| 60 | 28 | 52 | 20 | 62 | 30 | 54 | 22 |
| 3 | 35 | 11 | 43 | 1 | 33 | 9 | 41 |
| 51 | 19 | 59 | 27 | 49 | 17 | 57 | 25 |
| 15 | 47 | 7 | 39 | 13 | 45 | 5 | 37 |
| 63 | 31 | 55 | 23 | 61 | 29 | 53 | 21 |

The system then displays the super-pel so generated to effect the display of the application-specified RGB value.

Functions SortColorCntTable and MakeDitherBitmap implement the determining of the darkest color and the setting of the output pattern. Function SortColorCntTable sorts array cc according to the darkness of the colors. Array PColorIntensities contains the darkness ordering for the colors. Function SortColorCntTable implements a bubble sort. Function MakeDitherBitmap stores the output pattern into array output. The function uses array prev_pattern to track when a pel in the output pattern has been set to a color. The variable current_count contains the count of the pels. Each time through the main for loop the function sets those pels that are not already set and whose corresponding pattern value is less than current_count to a color. Continuing with the example, the darkest color is 5, the next darkest is 7, the next darkest is C, and the lightest is D. Table 12 contains the array cc sorted by darkness.

TABLE 12

| cc | |
|---|---|
| color | count |
| 5 | 18 |
| C | 16 |
| D | 15 |
| 7 | 15 |

Table 13 contains the color pattern for the super-pel as stored in array output. When the for loop is first executed variable current_count is set to 18, which is the number of pels to be set for color 5. The function sets each pel in the super-pel to the color 5 when the corresponding value in the array pattern is less than variable current_count. The next time through the for loop the color 7 is processed and variable current_count is set to 34 (18+16). The function sets each pel in the super-pel not already set to the color 7 when the corresponding value in array pattern is less than the variable current_count. The function continues processing the colors C and D in the same manner.

TABLE 13

| 5 | 7 | 5 | C | 5 | C | 5 | C |
|---|---|---|---|---|---|---|---|
| C | 5 | D | 7 | D | 7 | D | 7 |
| 5 | C | 5 | C | 5 | C | 5 | C |
| D | 7 | D | 7 | D | 7 | D | 7 |
| 5 | C | 5 | C | 5 | 7 | 4 | C |
| D | 7 | D | 7 | D | 5 | D | 7 |
| 5 | C | 5 | C | 5 | C | 5 | C |
| D | 7 | D | 7 | D | 7 | D | 7 |

TABLE 14

```
 5  #define false 0
    #define true  1 int R, G, B;
    int output[64];
10  int SwapRB, SwapGB, SwapRG
    int nColors;
    struct ColorCount
      { int color;
        int count;
15    } cc[4];

void ComputeSymmetry (void) /*******************/
20  {
       if (R < B)
         { Swap(&R, &B);
           SwapRB = true; }
       else
25        SwapRB = false;
       if (G < B)
         { Swap(&G, &B);
           SwapGB = true;}
       else
30        SwapGB = false;
       if (R < G)
         { Swap(&R, &G);
           SwapRG = true;}
       else
35        SwapRG = false;
    } /* Return ComputeSymmetry */ void Swap (int *pA, int *pB) /*******************/
40  {
     int temp;

temp = *pA; *pA = *pB; *pB = temp;
    } /* Return Swap */
45 int ComputeSubspace (void) /*******************/
    {
     int i;
50  static int origin [4][3] =
       {{128, 128, 0   },
        {128, 128, 0   },
        {128, 128, 128},
        {255, 255, 0   }};
55  static int vector [4][3] =
```

```
         {{-1,   0,    0},
          {-1,  -1,    0},
          {-1,   0,   -1},
          {-1,   0,    0}};
    i = 0;
    while ((((R - origin[i][0]) * vector[i][0]) +
            ((G - origin[i][1]) * vector[i][1]) +
            ((B - origin[i][2]) * vector[i][2])) < 0)
      i++;
    return(i);
  } /* Return ComputeSubspace */ int Scale (int A) /********************/
  { return ((A/2 + A%2)/2);
  } void ComputeTransform(int i) /********************/
  {
    int tempR, tempG, tempB;
    static int origin [4][3] =
      {{32, 32,   0},
       {32, 32,   0},
       {32, 32,   0},
       {64,  0,   0}};
    static int matrix [4][3][3] =
      {{{-2,  0,   0},
        ( 2, -2,   0},
        ( 0,  0,   2}},
       {{-2, -2,   0},
        ( 2,  0,   0},
        ( 0,  0,   2}},
       {{ 1, -1,   0},
        ( 1,  1,   0},
        ( 0,  0,   2}},
       {{-2,  0,   0},
        ( 0,  1,  -1},
        ( 1,  1,   1}}};

tempR = R - origin[i][0];
    tempG = G - origin[i][1];
    tempB = B - origin[i][2];
    R = tempR * matrix[i][0][0] +
        tempB * matrix[i][0][1] +
        tempG * matrix[i][0][2];
    G = tempR * matrix[i][1][0] +
        tempB * matrix[i][1][1] +
        tempG * matrix[i][1][2];
    B = tempR * matrix[i][2][0] +
        tempB * matrix[i][2][1] +
        tempG * matrix[i][2][2];
  } /* Return ComputeTransform */
```

```
void MakeColorCntTable(int i) /********************/
{
  int j;
  static int colors[4][4] =
    {{0x02, 0x00, 0x01, 0x07},
     {0x02, 0x01, 0x09, 0x07},
     {0x02, 0x09, 0x0B, 0x07},
     {0x09, 0x07, 0x0B, 0x0F}};

j = -1;
  if (64 != R + G + B)
   {j++;
    cc[j].color = colors[i][0];
    cc[j].count = 64 - R - G - B;
   }
  if (R != 0)
   {j++;
    cc[j].color = colors[i][1];
    cc[j].count = R;
   }
  if (G != 0)
   {j++;
    cc[j].color = colors[i][2];
    cc[j].count = G;
   }
  if (B != 0)
   {j++;
    cc[j].color = colors[i][3];
    cc[j].count = B;
   }
  nColors = i;
} /* Return MakeColorCntTable */ void ComputePColor (void) /********************/
{
  for (i=0; i<nColors; i++)
    {
     temp = cc[i].color;
     if (SwapRG)
       temp = (temp & 0x04) &
              (temp & 0x01) << 1 &
              (temp & 0x02) >> 1;
     if (SwapGB)
       temp = (temp & 0x01) &
              (temp & 0x04) >> 1 &
              (temp & 0x02) << 1;
     if (SwapRB)
       temp = (temp & 0x02) &
              (temp & 0x01) << 2 &
              (temp & 0x04) >> 2;
     cc[i].color = temp;
    }
} /* Return ComputePColor */
```

```
    void SortColorCntTable (void) /*******************/
    {
5     int i, j;
      static int PColorIntensities [16] =
         { 0x00, 0x02, 0x03, 0x06, 0x01, 0x04, 0x05, 0x07,
           0xff, 0x0A, 0x0B, 0x0E, 0x09, 0x0C, 0x0D, 0x0F};

10    for (i=0; i<nColors; i++)
         {
           for (j=i+1; j<nColors; j++)
              {
                if (PColorIntensities[cc[i].color] >
15                  PColorIntensities[cc[j].color])
                   {
                     Swap(&cc[i].color, &cc[j].color);
                     Swap(&cc[i].count, &cc[j].count);
                   }
20           }
    } /* Return SortColorCntTable */ void MakeDitherBitmap (void) /*******************/
25  {
      int current_count;
      int prev_pattern[64];
      static int pattern[64] =
         ( 0, 32,  8, 40,  2, 34, 10, 42,
30        48, 16, 56, 24, 50, 18, 58, 26,
          12, 44,  4, 36, 14, 46,  6, 38,
          60, 28, 52, 20, 62, 30, 54, 22,
           3, 35, 11, 43,  1, 33,  9, 41,
          51, 19, 59, 27, 49, 17, 57, 25,
35        15, 47,  7, 39, 13, 45,  5, 37
          63, 31, 55, 23, 61, 29, 53, 21} current_count = 0;
      for (j=0; j<64; j++) prev_pattern[j] = false;
40    for (i=0; i<nColors; i++)
         {
           current_count += cc[i].count;
           for (j=0; j<64; j++)
              {
45              if (current_count > pattern[j] and !prev_pattern[j])
                   {
                     output[j] = cc[i].color;
                     prev_pattern[j] = true;
                   };
50           }
    } /* Return MakeDitherBitmap */ void ColorDither (void) /*******************/
55  {
```

```
    ComputeSymmetry();
    SubSpace = ComputeSubspace();
    R = Scale(R); G = Scale(G); B = Scale(B);
    ComputeTransform(SubSpace);
    MakeColorCntTable(SubSpace);
    ComputePColor();
    SortColorCntTable();
    MakeDitherBitmap();
} /* Return ColorDither */
```

It will be apparent to one skilled in the art that the present invention can be used with graphics adapters that have more than 16 active colors. One skilled in the art would select 15 colors out of the total number of active colors to represent the vertices of the color cube. For example, an embodiment of the present invention would use 15 colors out of the 256 active colors of the IBM 8514/A graphics adapter.

It will also be apparent to one skilled in the art that a different base pattern can be used and still achieve acceptable color dithering.

Although the present invention has been described in terms of a preferred embodiment, it is not intended that the invention be limited to this embodiment. Modification within the spirit of the invention will be apparent to those skilled in the art. The scope of the present invention is defined by the claims which follow.

It will be apparent to one skilled in the art that the present invention can be used with graphics adapters that have more than 16 active colors. One skilled in the art would select 15 colors out of the total number of active colors to represent the vertices of the color cube. For example, an embodiment of the present invention would use 15 colors out of the 256 active colors of the IBM 8514/A graphics adapter.

It will also be apparent to one skilled in the art that a different base pattern can be used and still achieve acceptable color dithering.

Although the present invention has been described in terms of a preferred embodiment, it is not intended that the invention be limited to this embodiment. Modification within the spirit of the invention will be apparent to those skilled in the art. The scope of the present invention is defined by the claims which follow.

We claim:

1. A method in a computer system for generating a dither pattern to represent a color having an RGB value, an RGB value representing red, green, and blue intensity levels that comprise the color, the dither pattern having a plurality of pels, each pel for selectably setting to one of a plurality of active colors, the active colors representing possible color setting for the pels, each RGB value representing a point in a three-dimensional coordinate system, the coordinate system having a plurality of non-overlapping tetrahedral spaces, each tetrahedral space having four vertices, each vertex corresponding to an active color, the method comprising the steps of:

designating one tetrahedral space as being a mapping tetrahedral space;

designating an RGB value for which a dither pattern is to be generated;

mapping the designated RGB value to the mapping tetrahedral space from an original tetrahedral space containing the designated RGB value wherein the mapped RGB value is in the same position relative to the vertices of the mapping tetrahedral space as the designated RGB value is relative to the vertices of the original tetrahedral space;

determining four active colors whose corresponding RGB values are closest to the mapped RGB value;

determining a number of pels in the dither pattern to set to each determined active color proportionally based on the distance between the RGB value corresponding to the determined active color and the mapped RGB value;

mapping the determined active colors to the original tetrahedral space; and setting the pels in the dither pattern to the mapped active colors based on the determined number of pels for each active color.

2. A method in a computer system for generating a dither pattern to represent one of a plurality of colors, each color represented by intensity levels of three component colors, each color represented by a point within a three-dimensional coordinate system having three axes, each axis representing the intensity level of a component color, the coordinate system having a plurality of non-overlapping spaces, the dither pattern having a plurality of pels, each pel for being selectably set to one of a plurality of displayable colors, the method comprising the steps of:

receiving intensity levels of color components for a color to be represented by a dither pattern, wherein the received intensity levels correspond to a point within a space;

determining a plurality of closest points within the space that corresponds to displayable colors which are closest to the point;

determining a number of pels in the dither pattern to set to each of the displayable colors that corresponds to the closest points, wherein the number of pels is based on the distances from the closest points to the point; and for each displayable color that corresponds to a closest point, setting the determined number of pels in the dither pattern to that displayable color.

3. The method of claim 2 wherein the points corresponding to the displayable colors represent vertices of an outer color cube and vertices of an inner color cube within the coordinate system, wherein the outer and inner color cube have one vertex in common.

4. The method of claim 3 wherein the plurality of non-overlapping spaces comprise six tetrahedral spaces bounded by the outer color cube.

5. The method of claim 4 wherein the intensity levels of color components range from a 0 value to a maximum value, and wherein the outer color cube includes points (0, 0, 0) and (M, M, M) as vertices wherein M represents the maximum value.

6. The method of claim 5 wherein the inner color cube includes points (0, 0, 0) and (m, m, m) as vertices, wherein m represents a value less than the maximum value.

7. The method of claim 6 wherein the six tetrahedral spaces are defined by the equations $R \geq G \geq B$ $R \geq B \geq G$ $B \geq R \geq G$ $B \geq G \geq R$ $G \geq B \geq R$ $G \geq R \geq B$ wherein R represents the intensity level for a first color component, G represents the intensity level for a second color component, and B represents the intensity level for a third color component.

8. The method of claim 6 wherein m represents a value of approximately one-half the maximum value.

9. The method of claim 8 wherein the six tetrahedral subspaces are separated by the planes:

R=B

R=G

B=G wherein R represents the intensity level for a first color component (R component), G represents the intensity level for a second color component (G component), and B represents the intensity level for a third color component (B component).

10. The method of claim 9 wherein the step of determining a plurality of closest points includes the steps of:

dividing the space into four tetrahedral subspaces, each tetrahedral subspace having four vertices, each vertex of a tetrahedral subspace corresponding to a vertex of the inner or outer cube, wherein the vertices of each tetrahedral subspace represents the closest points corresponding a displayable color to each point within the tetrahedral subspace;

determining which tetrahedral subspace contains the point; and selecting the four vertices of the determined tetrahedral subspace as the closest points.

11. The method of claim 9 wherein the step of determining a plurality of closest points includes the steps of:

mapping the point from the space to a mapped point within a mapping space;

determining a plurality of closest points within the mapping space that corresponds to the displayable colors which are closest to the point; and mapping the plurality of closest points within the mapping space to closest points within the space, wherein the closest points within the space correspond to displayable colors which are closest to the point.

12. The method of claim 11 wherein the step of mapping the point includes the steps of:

defining a temporary point having intensity levels equal to the point;

when the temporary point is above the R=B plane, swapping the intensity level values of the R and B components of the point;

when the temporary point is above the G=B plane, swapping the intensity level values of the G and B components of the temporary point;

when the temporary point is above the R=G plane, swapping the intensity level values of the R and G components of the temporary point; and setting the mapping point equal to the intensity levels of the temporary point.

13. The method of claim 12 wherein the step of mapping the plurality of closest points within the mapping space includes the step of:

defining temporary closest points having intensity levels equal to the closest points;

when the intensity levels values of the R and G components of the temporary point were swapped, swapping the intensity level values of the R and G components of the temporary closest points;

when the intensity level values of the G and B components of the temporary point were swapped, swapping the intensity level values of the G and B components of the temporary closest points;

when the intensity level values of the R and B components of the temporary point were swapped, swapping the intensity level values of the R and B components of the temporary closest points; and selecting as the closest points within the space, points having intensity levels equal to the temporary closest points.

14. The method of claim 2 wherein the step of determining a plurality of closest points includes the steps of:

mapping the point from the space to a mapped point within a mapping space;

determining a plurality of closest points within the mapping space that corresponds to the displayable colors which are closest to the point; and mapping the plurality of closest points within the mapping space to closest points within the space, wherein the closest points within the space correspond to displayable colors which are closest to the point.

15. The method of claim 14 wherein the following points define vertices of an outer color cube within the coordinate system:

( 0, 0, 0)
(255, 0, 0)
( 0, 255, 0)
(255, 255, 0)
( 0, 0, 255)
(255, 0, 255)
( 0, 255, 255)
(255, 255, 255)

and wherein the six spaces define tetrahedral spaces within the outer color cube.

16. A method for generating a dither pattern for a color, a color represented by a red, a blue, and a green intensity level ranging in integral numbers between 0 and 255, wherein 0 represents low intensity and 255 represents high intensity, the dither pattern having a plurality of pels for displaying on a color display device, the color display device having a plurality of pels and a plurality of displayable colors, each pel of the display device for selectably displaying one of the plurality of displayable colors, the method comprising the steps of:

defining a three-dimensional coordinate system, the coordinate system having three axes, wherein one axis represents the intensity level for the color red, one axis represents the intensity level for the color green, and one axis represents the intensity level for the color blue and wherein each color corresponds to a point within the coordinate system;

setting a plurality of displayable colors to colors corresponding to the following points within the coordinate system:

( 0, 0, 0)
(128, 0, 0)
( 0, 128, 0)
(128, 128, 0)
( 0, 0, 128)
(128, 0, 128)
( 0, 128, 128)
(128, 128, 128)
(255, 0, 0)
( 0, 255, 0)
(255, 255, 0)
( 0, 0, 255)
(255, 0, 255)
( 0, 255, 255)
(255, 255, 255)

wherein the first component represents the intensity level of the color red, the second component represents the intensity level of the color green, and the third component represents the intensity level of the color blue;

dividing the coordinate system into six spaces, the six spaces defined by the following equations:

$R >= G >= B$ $R >= B >= G$ $B >= R >= G$ $B >= G >= R$ $G >= B >= R$ $G >= R >= B$ wherein R represents the intensity level for the color red, G represents the intensity level for the color green, and B represents the intensity level for the color blue;

receiving a color to display on the display device, the received color corresponding to a point within a space designated as an original space;

designating a space as a mapping space;

mapping the point corresponding to the received color from the original space to a point within the mapping space;

determining which four points corresponding to a displayable color are closest to the mapped point within the mapping space;

mapping each of the four determined points from the mapping space to a point corresponding to a displayable color within the original space;

for each of the four mapped determined points, determining a number of pels in the dither pattern to set to the displayable color corresponding to the mapped point, wherein the number of pels is proportional to the distance of the point in the original space corresponding to the received color from each of the four mapped determined points;

setting the pels in the dither pattern in accordance with the determined number of pels for each displayable color; and displaying the dither pattern on the display device.

17. A method in a computer system for generating a dither pattern to represent one of a plurality of colors, each color represented by intensity levels of three component colors, each color represented by a point within a three-dimensional coordinate system having three axes, each axis representing the intensity level of a component color, the coordinate system having a plurality of non-overlapping spaces, the dither pattern having a plurality of pels, each pel for being selectably set to one of a plurality of displayable colors, each space having vertices, each vertex corresponding to a displayable color, the method comprising the steps of:

receiving intensity levels of color components for a color to be represented by a dither pattern, wherein the received intensity levels correspond to a point within one of the plurality of spaces;

determining which one of the plurality of spaces contains the point;

selecting the displayable colors represented by the vertices of the determined space to use to generate the dither pattern; and for each selected displayable color, setting a number of pels in the dither pattern to that selected displayable color wherein the number of pels set to that selected displayable color is based on the distance between the point and the vertex corresponding that selected displayable color.

18. The method of claim 17 wherein the spaces are tetrahedral spaces having four vertices each.

19. A method in a computer system for displaying a dither pattern representing a color specified by an application program on a display device, the display device connected to the computer through a graphics adapter, the graphics adapter having a plurality of active colors for display on the display device, each color represented by three component colors, each color represented by a point within a three-dimensional coordinate system, each dimension representing an intensity level of a component color, the dither pattern having a plurality of pels, each pel for being selectably set to one of the plurality of active colors, the method comprising the steps of:

receiving the intensity levels of the color components of the specified color;

determining which four active colors are chromatically closest to the specified color based on the distance between the point representing the specified color and the point representing each active color;

determining a number of pels in the dither pattern to set to each of the determined four active colors based on the distance between the point representing the specified color and the point representing each active color;

for each determined active color, setting the determined number of pels in the dither pattern to the determined active color;

storing the dither pattern in the graphics adapter; and displaying the stored dither pattern on the display device to represent the display of the specified color.

20. A method of displaying a representation of a display image on a display device, the display image having a plurality of display areas, each display area having an associated color, the display device having a plurality of displayable colors, each color having three color components with an intensity level, each color representing a point within a three-dimensional coordinate system, each dimension representing an intensity level of a color component, the method comprising the steps of:

for each color associated with a display area, generating a dither pattern to represent the associated color, the dither pattern having a plurality of pels set to a displayable color, wherein the step of generating the dither pattern includes:

determining which four of the displayable colors are chromatically closest to the associated color based on the distance between the point representing the associated color and the point representing each displayable color;

determining a number of pels in the dither pattern to set to each of the determined four displayable colors based on the distance between the point representing the associated color and the point representing each determined displayable color; and for each determined displayable color, setting the determined number of pels in the dither pattern; and for each display area, displaying on the display device the generated dither pattern for the color associated with the display area to effect the display of the representation of the display image.

21. A method in a computer system for generating a dither pattern to represent one of a plurality of colors, each color represented by a number of component colors, the dither pattern having a plurality of pels, each pel for being selectably set to one of a plurality of displayable colors, the method comprising the steps of:

receiving the number of color components for a color to be represented by a dither pattern;

selecting a number of displayable colors for use in generating the dither pattern based on the received color components, the number of selected displayable colors being greater than two;

determining a number of pels in the dither pattern to set to each of the selected displayable colors based on the chromatic distances from the selected displayable colors to the color to be represented by the dither pattern; and for each selected displayable color, setting the determined number of pels in the dither pattern to that selected displayable color.

22. The method of claim 21 including the step of determining a plurality of displayable colors includes the step of determining a plurality of displayable colors that are chromatically closest to the color to be represented by the dither pattern.

23. The method of claim 21 including the steps of:

representing color components by intensity level; and receiving the intensity levels of the color components.

24. A method in a computer system for generating a dither pattern to represent one of a plurality of colors, each color represented by intensity levels of three component colors, each color represented by a point within a three-dimensional coordinate system having three axes, each axis representing the intensity level of a component color, the dither pattern having a plurality of pels, each pel for being selectably set to one of a plurality of displayable colors, the method comprising the steps of:

receiving intensity levels of color components for a color to be represented by a dither pattern, wherein the received intensity levels correspond to a point within a space;

determining four closest points within the space that corresponds to displayable colors which are closest to the point;

determining a number of pels in the dither pattern to set to each of the displayable colors that corresponds to the four closest points, wherein the number of pels is based on the distances from the four closest points to the point; and for each displayable color that corresponds to a closest point, setting the determined number of pels in the dither pattern to that displayable color.

* * * * *